(12) United States Patent
Dauvois

(10) Patent No.: US 7,600,238 B2
(45) Date of Patent: Oct. 6, 2009

(54) METHOD FOR VERIFYING TELEVISION RECEIVER SETS WITH ACCESS CONTROL AND CORRESPONDING RECEIVER SET

(75) Inventor: Jean-Luc Dauvois, Le Mans (FR)

(73) Assignee: Nagra Thomson Licensing, Boulogne-Billancourt (FR)

( * ) Notice: Subject to any disclaimer, the term of this patent is extended or adjusted under 35 U.S.C. 154(b) by 696 days.

(21) Appl. No.: 10/493,378

(22) PCT Filed: Oct. 25, 2002

(86) PCT No.: PCT/FR02/03673

§ 371 (c)(1),
(2), (4) Date: Oct. 8, 2004

(87) PCT Pub. No.: WO03/036974

PCT Pub. Date: May 1, 2003

(65) Prior Publication Data

US 2005/0044562 A1 Feb. 24, 2005

(30) Foreign Application Priority Data

Oct. 26, 2001 (FR) ................................. 01 13878

(51) Int. Cl.
*H04N 7/167* (2006.01)
*H04L 9/08* (2006.01)
(52) U.S. Cl. ........................................ 725/31; 380/278
(58) Field of Classification Search ................. None
See application file for complete search history.

(56) References Cited

U.S. PATENT DOCUMENTS

| | | | |
|---|---|---|---|
| 4,323,921 A | | 4/1982 | Guillou et al. |
| 4,833,710 A | * | 5/1989 | Hirashima ................. 380/233 |
| 6,357,046 B1 | * | 3/2002 | Thompson et al. .......... 725/139 |
| 6,452,616 B1 | * | 9/2002 | De Vito et al. .............. 715/825 |
| 6,789,106 B2 | * | 9/2004 | Eyer et al. .................. 709/205 |
| 7,275,163 B2 | * | 9/2007 | Cocchi et al. ............... 713/193 |
| 2002/0002706 A1 | * | 1/2002 | Sprunk ........................ 725/29 |

FOREIGN PATENT DOCUMENTS

| | | |
|---|---|---|
| EP | 0427601 A1 | 5/1991 |
| FR | 2448825 A1 | 9/1980 |

(Continued)

OTHER PUBLICATIONS

Indian First Examination Report for Patent Application No. 866/CHENP/2004, dated Jan. 5, 2009, 2 pages.

*Primary Examiner*—Joseph P Hirl
*Assistant Examiner*—Mushfikh Alam
(74) *Attorney, Agent, or Firm*—Osha • Liang LLP

(57) ABSTRACT

The invention concerns a method for verifying television receiver sets with access control and a corresponding receiver set. The invention is characterized in that a broadcaster performs parametered calculations, for example through the subscriptions and the characteristics of the receiver sets. The results of said calculations are transmitted to the receiver set which store them. In order to verify a receiver, the broadcaster transmits thereto the parameter(s) used, the receiver performs the calculation and compares the result it obtains with that which it has stored. In case of non-conformity, the receiver set modifies its operating conditions. The invention is applicable to television with access control.

8 Claims, 2 Drawing Sheets

FOREIGN PATENT DOCUMENTS

| WO | WO-9856179 | 12/1998 |
| WO | WO 01/11820 A1 | 2/2001 |
| WO | WO 01/35635 A2 | 5/2001 |
| WO | WO 01/41443 A1 | 6/2001 |
| WO | WO 01/50755 A1 | 7/2001 |

* cited by examiner

METHOD FOR VERIFYING TELEVISION RECEIVER SETS WITH ACCESS CONTROL AND CORRESPONDING RECEIVER SET

TECHNICAL FIELD

The present invention concerns a method for verifying television receivers with access control and a receiver that is capable of being verified using this method.

STATE OF THE ART

In television with access control, the data to transmit is first scrambled using an encryption algorithm and the scrambled data is then broadcast together with access control messages. The receivers of subscribers that have subscribed to the appropriate subscription are loaded with information that constitutes an access right allowing them to find in the access control messages the key required for the descrambling of transmitted data.

As an example, the document FR-A-2 448 825 describes a system that uses subscription keys Ci, which randomly change in relatively long intervals ranging in the order of a month, and a service key K that also changes randomly but in short intervals ranging in the order of a few minutes. The data is descrambled using the service key K. The access control messages Mi are obtained from the subscription keys Ci and the service key K using an algorithm that is defined by the subscription keys Ci. In the receiver set of a subscriber, the chip card contained therein has been loaded with keys corresponding to subscriptions to which the subscriber has subscribed. The terminal associated to the card contains a circuit for retrieving the service key K, that receives the messages Mi and that has available the subscription key Ci contained in the card. Descrambling means then retrieve the data in descrambled form.

Although providing satisfaction in many aspects, such a technology bears the inconvenience to be subject to fraud. Indeed, a receiver could be modified by a skilled person guilty of fraud to be able to receive a programme although the subscriber has not paid for the corresponding subscription. Avoiding such fraud (or reducing it), would require to periodically make verifications at the subscriber's place in order to check the integrity of their receiver. This is hardly conceivable for obvious commercial reasons.

The present invention therefore aims at addressing this problem.

SUMMARY OF THE INVENTION

According to the invention, the verification of a receiver is initiated by the broadcast institution and is performed by the receiver itself. If the verification reveals that the receiver has kept its integrity, then it continues to operate normally. In the opposite case, the operation is altered, in one way or another, for example by partial or total halt.

According to the invention, this is achieved as follows:

A)—the broadcaster performs calculations defined by one or many determined parameters;

the broadcaster then transmits to each receiver the results of the calculations that are intended for it, each receiver storing the various results;

B)—in order to verify a specific receiver, the broadcaster transmits to this receiver the one or many determined parameters;

the receiver then performs the calculation and compares the result that it obtains with the corresponding result that it has stored ; in case of difference, it alters its operation in an appropriate manner, for example by stopping to operate.

When the receiver comprises a terminal and a chip card, preferably the chip card stores the results of the calculations transmitted by the broadcaster and the terminal performs the concerned calculations.

In a first alternative, the terminal transmits the result of its calculation to the card; the latter compares this result with the one that it stores and, in case of difference, it alters the operation of the receiver, for example by refusing to cooperate with the terminal.

In a second alternative the terminal reads from the card among the results the one that corresponds to the calculation that it has performed and compares this result with the one that it has itself obtained ; in case of difference, it alters the operation of the receiver, for example by refusing to cooperate with the card.

The parameters used may be constituted by a first parameter corresponding to one of the subscriptions and by a second parameter constituted by one of the characteristics of the receivers, for example the serial number of their chip card (which is unique).

The implemented calculation algorithms may be of any type: these may be symmetric or asymmetric encryption algorithms, of RSA type, of HASH type, of DES type or of any other type.

The calculation algorithm implemented in relation with a subscription is not necessarily the same as the one implemented with the others. This algorithm may be installed in the terminal at manufacturing or loaded by the broadcaster at the time of verification.

The present invention also concerns a television receiver that is capable of being controlled according to the method that has just been defined. This receiver comprises a terminal and a chip card containing access rights and it is characterized in that:

the card further contains various calculation results, the terminal comprises means capable of performing a determined calculation by using one or many determined parameters, the receiver comprises means for comparing the calculation result performed by the terminal with the corresponding result contained in the card, the receiver comprises means for altering its operation in an appropriate manner in case of a difference between the 2 results.

In a first alternative, the means for comparing the results are located in the card, the latter being capable of altering the operation of the receiver.

In a second alternative, the means for comparing the results are located in the terminal, the latter being capable of altering the operation of the receiver.

One of the parameter may correspond to one of the subscriptions and an other parameter may be one of the characteristics of the receiver and for example the serial number of the card.

BRIEF DESCRIPTION OF THE DRAWINGS

The FIGS. 1 to 3 each illustrate, in a schematic manner, a receiver capable of implementing the method according to the invention.

DETAILED DESCRIPTION OF PREFERRED EMBODIMENTS

Figure 1:
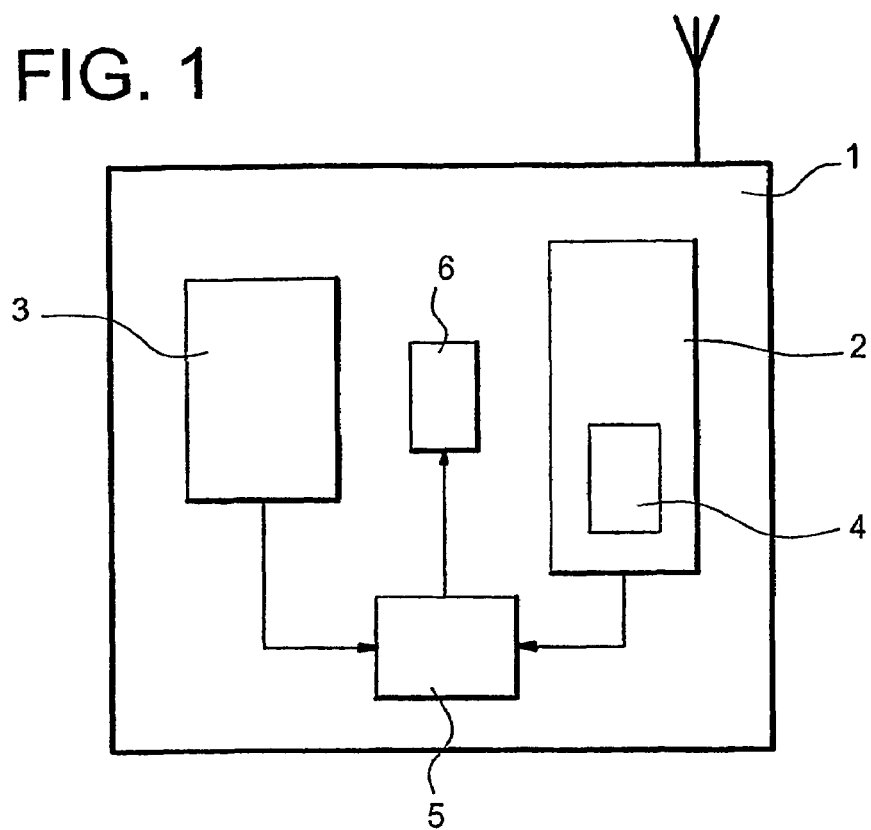

It is assumed, in a non limitative way of example, that the calculation algorithm is a symmetric key encryption algorithm that applies to the serial number of the chip card. Such algorithms are presently used in access control, in particular for retrieving the service key (see the introduction). We name $A_{C_i}(NSj)$ the algorithm using the key Ci, wherein the index I relates to the n different subscriptions of the system (I varying from 1 to n), and NSj represents the serial number of the j-th receiver, the index j identifying the receiver (j varying from 1 to p). The result of this calculation is written Ri,j. It is assumed that each receiver has all n subscription keys Ci.

The broadcaster calculates, at some point in time, the np results Ri,j, i varying from 1 to n and j from 1 to p. Only n results Ri,q correspond to a receiver of determined rank q (j=q), the n results Ri,q corresponding to the n subscription keys Ci (i from 1 to n).

In order to perform the verification of the receiver of rank q, the broadcaster chooses one of the subscription keys among the n, say Ck, and commands the receiver to perform the calculation by using the key Ck as parameter. This calculation had produced the result Rk,q at the time it had been performed by the broadcaster. It thus calculates $A_{C_i}(NSj)$ and compares the result with the one it has already received from the broadcaster and that it has stored. If the results are found to be equal, the receiver continues its normal operation. If the results are different from each other, or if the receiver may not even perform the requested calculation, then a manipulation of the receiver was made in fraud and the operation may be interrupted.

The table I summarizes these operations.

This table does not indicate which means of the receiver perform the comparison of the results. In the table II, it is assumed that the card is used for this task. In this case, the results written in the card are not readable by the terminal. The table III corresponds to the case in which the terminal is used for the comparison. In both tables II and III the index q, which identifies the receiver, has been left out to simplify the notations.

TABLE I

| BROADCASTER | RECEIVER j = q |
|---|---|
| Calculates all the<br>Rij = $A_{C_i}$(NSj)<br>(i from 1 to n)<br>(j from 1 to p)<br>Transmits to receiver q<br>Ci (i from 1 to n) Ri, q<br>Commands the receiver q<br>to calculate while<br>indicating i = k, that is<br>$A_{C_k} R_{k,q}$ = (NSq) | Stores Ci (i from 1 to n)<br>Stores Ri, q<br>Calculates R'k, q = $A_{C_k}$(NSq)<br>Compares R'k, q with Rk, q |

TABLE II

| CHIP CARD | TERMINAL |
|---|---|
| Store Ci and Ri<br>(i from 1 to n) | Receives command to<br>calculate with a |
| Compares R'i with Ri | determined Ci<br>Reads from the card Ci<br>and NS<br>Calculates R'i = $A_{C_i}$(NS)<br>Transmits R'i to the card |

TABLE III

| CHIP CARD | TERMINAL |
|---|---|
| Stores Ci and Ri | Receives the command to<br>calculate with determined<br>Ci<br>Reads from the card Ci<br>and NS<br>Calculates R'i = $A_{C_i}$(NS)<br>Reads Ri from the card<br>Compares R'i with Ri |

As a simple example, it can be assumed that to each receiver corresponds one subscription. The broadcaster calculates the n results $R_i$. A result $R_q$ corresponds to a receiver of rank q, the result $R_q$ corresponding to the subscription key $C_q$ and to the algorithm $AC_q$.

In order to perform the verification of this receiver, the broadcaster commands the receiver to perform the calculation while taking this key $C_q$ as parameter. This calculation had produced the result $R_q$ at the time when the broadcaster had performed it. The receiver thus calculates $AC_q(NSq)$ and compares the obtained result with the $R_q$ one that it obtained from the broadcaster.

It will be noted that according to the invention the terminal and the chip card are dynamic products in the sense that their contents may vary: at any time they may receive new access rights and new results of calculation.

The calculation algorithm may use other keys than the subscriptions keys as such, for example diversified keys obtained from a base key combined with the identifier of each chip card. In this case, each receiver performs a calculation with a key that is specific to the receiver. Also, the algorithm may be changed or amended dynamically.

Figure 2:
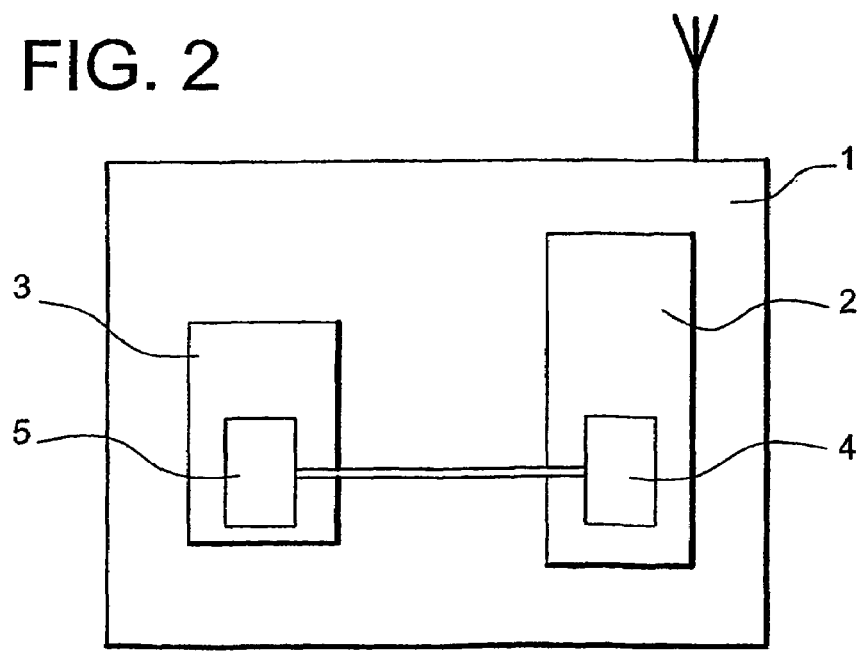
Figure 3:
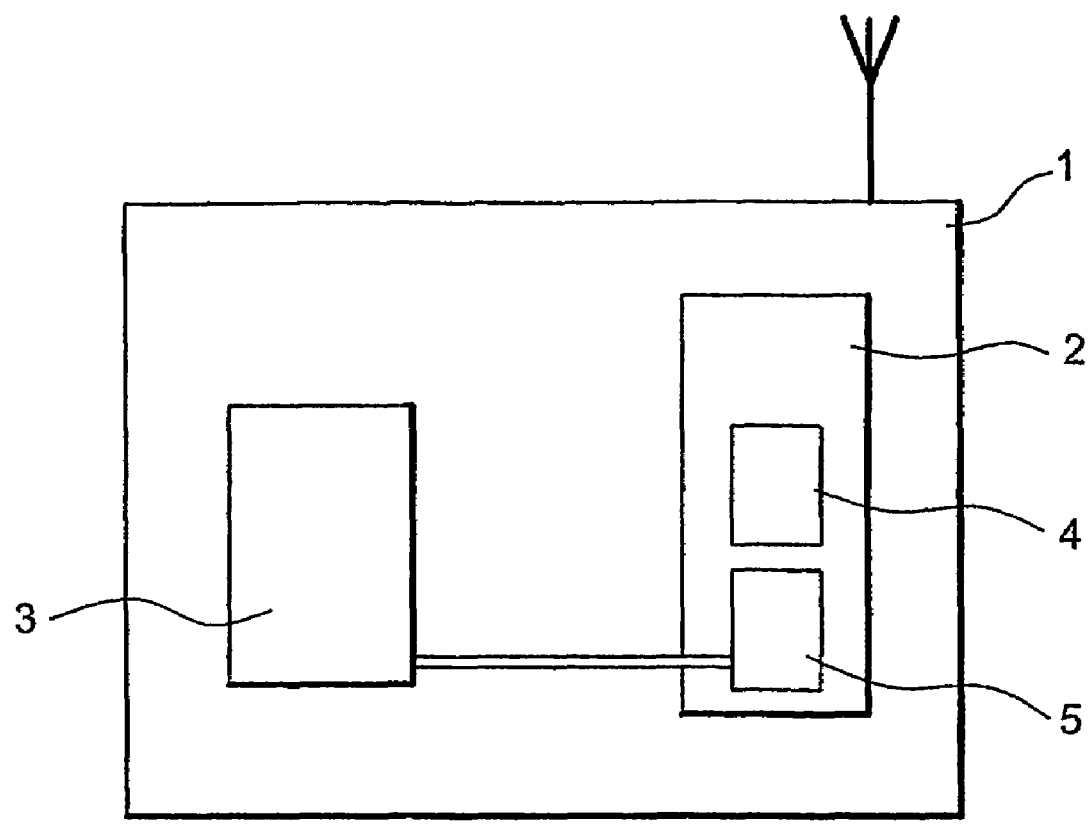

Each one of the receiver embodiments corresponding to the tables 1 to 3 is illustrated in each of the respective FIGS. 1 to 3.

In FIG. 1 the television receiver 1 capable of being verified by the method according to one of the embodiments of the invention comprises a terminal 2 and a chip card 3 containing access rights pertaining to subscriptions. The card further contains various calculation results.

The terminal 2 comprises means 4 capable of performing any one of the calculations according to the method by using one or many predetermined parameters.

The receiver 1 comprises means 5 for comparing the calculation result performed by the terminal 2 with the corresponding result contained in the card 3.

The receiver comprises means 6 for altering its operation in an appropriate manner in case of a difference between the two results.

In the embodiment of the FIG. 2, the means 5 for comparing the calculation result performed by the terminal 2 with the corresponding result contained in the card 3, are located in the card 3, the latter being capable of altering the operation of the receiver.

In the embodiment of the FIG. 3 the means 5 for comparing the calculation result performed by the terminal 2 with the corresponding results contained in the card 3, are located in the terminal 2, the latter being capable of altering the operation of the receiver.

The invention claimed is:

1. A method for verifying a receiver for a television system with access control, wherein the receiver comprises a chip card, wherein a broadcaster transmits corresponding access rights to subscribers having subscribed to subscriptions, the receiver storing the access rights in the chip card, the method comprising:

the broadcaster performing a plurality of calculations, wherein each of the plurality of calculations is defined by a first parameter corresponding to one of the subscriptions and a second parameter constituted by one of a plurality of characteristics of the receiver;

the broadcaster then transmitting to the receiver a plurality of results corresponding to the plurality of calculations that is intended for the receiver, the receiver storing the plurality of results in the chip card, wherein in order to verify the receiver:

the broadcaster, after sending the plurality of results, chooses a first parameter and a second parameter specific to the receiver and transmits the chosen parameters to the receiver, the receiver performs a subset of the calculations performed by the broadcaster, which is less than said plurality of calculations performed by the broadcaster, using the first and second parameters chosen by the broadcaster comparing the result obtained by the receiver and the result previously stored by the receiver, and, in case of difference, altering an operation of the receiver to one selected from a group consisting of a partial halt and a total halt, wherein the partial halt is defined as partially stopping the operation of the receiver and a total halt is defined as stopping operation of the receiver;

wherein the calculations performed by the broadcaster and the receiver are defined by an encryption algorithm, the first parameter being a subscription key used as an encryption key for the encryption algorithm and the second parameter being a serial number of the receiver.

2. The method according to claim 1, wherein the receiver comprises a terminal, and wherein the terminal performs the calculation commanded by the broadcaster.

3. The method according to claim 2, wherein:

the terminal transmits the result of its calculation to the chip card, the chip card compares the result transmitted by the terminal and the corresponding result that the chip card has received from the broadcaster, and in case of a difference, the chip card alters the operation of the receiver.

4. The method according to claim 2, wherein:

the terminal reads from the chip card the result corresponding to the calculation that the terminal performs, the terminal compares the result of its calculation with the result read from the chip card, and in case of a difference, the terminal alters the operation of the receiver.

5. A television receiver capable of being verified using the method according to claim 1, the receiver comprising a terminal and a chip card containing access rights pertaining to subscriptions, wherein:

the chip card further comprises a plurality of calculation results calculated and transmitted by a broadcaster, the terminal comprises means capable of performing a subset of the calculation results calculated by the broadcaster by using a first determined parameter and a second determined parameter received from the broadcaster after the broadcaster transmits the calculation results, wherein each of the plurality of calculations is defined by the first determined parameter corresponding to one of the subscriptions and the second determined parameter comprising one of a plurality of characteristics of the receiver, the receiver comprises means for comparing the one calculation result performed by the terminal with a corresponding result stored in the chip card, and the receiver comprises means for altering the receiver operation to one selected from a group consisting of a partial halt and a total halt in case of a difference between the one calculated result and the corresponding stored result.

6. The television receiver according to claim 5, wherein the means for comparing the results are located in the chip card, wherein the chip card is capable of altering the operation of the receiver.

7. The television receiver according to claim 5, wherein the means for comparing the results are located in the terminal, wherein the terminal is capable of altering the operation of the receiver.

8. The television receiver according to claim 5, wherein the second parameter used to perform the calculation is a unique serial number of the chip card.

* * * * *

UNITED STATES PATENT AND TRADEMARK OFFICE
CERTIFICATE OF CORRECTION

PATENT NO.        : 7,600,238 B2                                    Page 1 of 1
APPLICATION NO.   : 10/493378
DATED             : October 6, 2009
INVENTOR(S)       : Jean-Luc Dauvois It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Fifth Day of October, 2010

David J. Kappos
*Director of the United States Patent and Trademark Office*